(12) United States Patent
Gerding et al.

(10) Patent No.: US 7,717,797 B2
(45) Date of Patent: *May 18, 2010

(54) DRIVESHAFT ASSEMBLY WITH PILOTED FLANGE CONNECTION

(75) Inventors: Austin Richard Gerding, Royal Oak, MI (US); Salvatore N. Grupido, Rochester, MI (US); Marc M. Menosky, Burt, MI (US); Thomas J. Oldenburg, Swartz Creek, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/263,698

(22) Filed: Nov. 3, 2008

(65) Prior Publication Data

US 2009/0054163 A1 Feb. 26, 2009

Related U.S. Application Data

(63) Continuation of application No. 11/417,349, filed on May 3, 2006, now Pat. No. 7,445,558.

(51) Int. Cl.
*F16C 3/00* (2006.01)
(52) U.S. Cl. .................... 464/182; 464/134
(58) Field of Classification Search ............ 464/134, 464/182; 403/337, 338, 335, 367, 359.1
See application file for complete search history.

(56) References Cited

U.S. PATENT DOCUMENTS

| 195,508 | A | 12/1877 | Dowling |
| 2,602,308 | A | 7/1952 | Bonnet |
| 3,848,694 | A | 11/1974 | Matsui et al. |
| 4,464,137 | A | 8/1984 | Jennings |
| 4,854,764 | A | 8/1989 | Faber et al. |
| 6,083,108 | A | 7/2000 | Grubish |
| 6,582,151 | B2 | 6/2003 | Hopson |
| 6,626,763 | B2 | 9/2003 | Aoki et al. |
| 6,893,349 | B2 | 5/2005 | Krugman et al. |
| 7,029,398 | B1 | 4/2006 | Burnard et al. |
| 2005/0164803 | A1 | 7/2005 | Naylor et al. |

FOREIGN PATENT DOCUMENTS

DE  3730728 A1 * 4/1989

* cited by examiner

*Primary Examiner*—Aaron M Dunwoody
(74) *Attorney, Agent, or Firm*—Harness, Dickey & Pierce, P.L.C.

(57) ABSTRACT

A drivetrain that includes a drivetrain component, a flange structure, a yoke flange, a female guide portion and a male guide portion. The drivetrain component has a shaft that is rotatable about an axis. The flange structure is fixedly but removably coupled to the shaft. The female guide portion is directly coupled to one of the shaft and the yoke flange. The male guide portion is directly coupled to the other one of the shaft and the yoke flange. The male guide portion engages the female guide portion to thereby align the yoke flange to the axis. The yoke flange and the flange structure are fixedly but removably coupled to one another.

23 Claims, 10 Drawing Sheets

DRIVESHAFT ASSEMBLY WITH PILOTED FLANGE CONNECTION

CROSS-REFERENCE TO RELATED APPLICATIONS

This application is a continuation of U.S. patent application Ser. No. 11/417,349 filed on May 3, 2006. The entire disclosure of the above application is incorporated herein by reference

INTRODUCTION

The present invention generally relates to vehicle drivetrains and more particularly to a piloted flange connection for transmitting rotary power between driveline components.

It is common to employ universal joints in a vehicle driveline to transmit rotary power between a transmission and an axle assembly. A conventional coupling for use in transmitting rotary power between such driveline components is illustrated in FIGS. 13 through 15. The coupling employs a flange structure 1000 and a yoke flange 1002. The flange structure 1000 includes a female splined portion 1004, a recess 1006, a pilot bore 1008 and a flange member 1010 having a plurality of coupling apertures 1012. The female splined portion 1004 is configured to matingly receive a corresponding splined portion 1020 that is formed on a shaft 1022 (e.g., an input pinion shaft of an axle assembly, an output shaft of a transmission or transfer case, or a input shaft of a transfer case). The mating splines 1004 and 1020 cooperate to align the flange structure 1000 to a rotational axis 1024 of the shaft 1022. The recess 1006 is sized to receive a lock washer 1028 and a nut 1030 and the nut 1030 is threadably coupled to an associated threaded portion 1032 of the shaft 1022 to thereby fixedly but removably couple the flange structure 1000 to the shaft 1022. The yoke flange 1002 includes a flange 1040 and a pair of yokes 1042 that are coupled to the flange 1040. The flange 1040 includes a pilot portion 1046 that is received in a slip-fit manner into the pilot bore 1008. The pilot portion 1046 and the pilot bore 1008 cooperate to align the yokes 1042 to the rotational axis 1024 of the shaft 1022. The flange 1040 can be coupled to the flange structure 1000 via a plurality of threaded fasteners (not shown).

It will be appreciated that the construction of such couplings requires the precise machining of various features, such as the pilot bore and the pilot portion and that such machining is relatively expensive. It will also be appreciated that considerations for stack-up tolerances must be made to guard against excessive run out (i.e., a difference between the rotational axis of the shaft and the centerline of the yokes) and that such considerations likewise tend to increase the cost of such couplings. Accordingly, there remains a need in the art for an improved driveline coupling that provides accurate alignment of the yokes to the rotational axis of the shaft.

SUMMARY

In one form, the present teachings provide a drivetrain that includes a drivetrain component, a flange structure, a yoke flange, a female guide portion and a male guide portion. The drivetrain component has a shaft that is rotatable about an axis. The flange structure is fixedly but removably coupled to the shaft. The female guide portion is directly coupled to one of the shaft and the yoke flange. The male guide portion is directly coupled to the other one of the shaft and the yoke flange. The male guide portion engages the female guide portion to thereby align the yoke flange to the axis. The yoke flange and the flange structure are fixedly but removably coupled to one another.

In another form, the present teachings provide a method for fabricating a drivetrain. The method includes: providing a first driveline component having a shaft that is rotatable about an axis; removably coupling a flange structure to the shaft such that the flange structure is co-rotatable with the shaft about the axis; pressing a yoke flange into engagement with the shaft to align the yoke flange to the axis; and rotatably coupling the yoke flange to the flange structure.

In yet another form, the present teachings provide a drivetrain that includes a drivetrain component, a flange structure and a yoke flange. The drivetrain component has a shaft that is rotatable about an axis. The shaft includes a male guide portion. The flange structure is fixedly but removably coupled to the shaft. The yoke flange includes a female guide portion having an aperture formed therein. The male guide portion is engaged to the female guide portion to thereby align the yoke flange to the axis. The yoke flange is also fixedly but removably coupled to the flange structure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
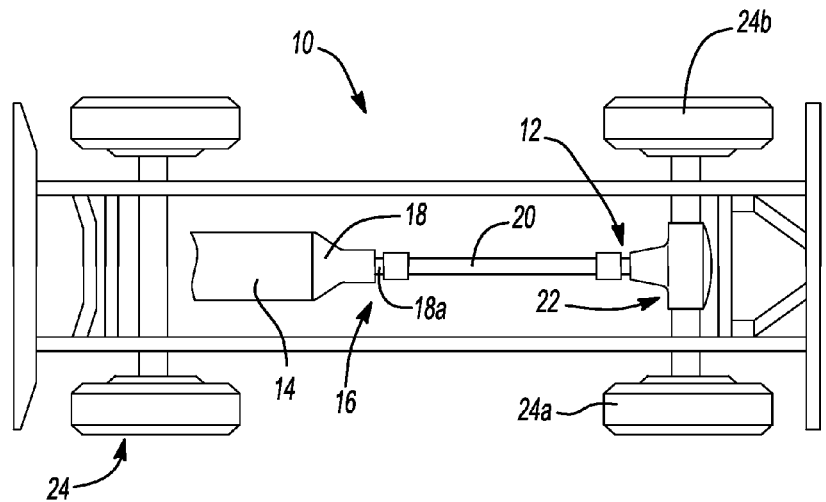
FIG. 1 is a schematic illustration of an exemplary vehicle constructed in accordance with the teachings of the present disclosure.

With reference to FIG. 1 of the drawings, an exemplary vehicle constructed in accordance with the teachings of the present disclosure is generally indicated by reference numeral 10. The vehicle 10 has a drivetrain which can include an engine 14 and a driveline 16. The driveline 16 can include a transmission 18, a propshaft assembly 20, a rear axle 22 and a plurality of wheels 24. The engine 14 can produce rotary power that can be transmitted to the transmission 18 in a conventional and well known manner. The transmission 18 can be conventionally configured and can include a transmission output shaft 18a and a gear reduction unit (not specifically shown). As is well known in the art, the gear reduction unit can change the speed and torque of the rotary power provided by the engine 14 such that a rotary output of the transmission 18 (which can be transmitted through the transmission output shaft 18a) can have a relatively lower speed and higher torque than that which was input to the transmission 18. The propshaft assembly 20 can be coupled for rotation with the transmission output member 18a to permit drive torque to be transmitted from the transmission 18 to the rear axle 22 where the drive torque can be selectively apportioned in a predetermined manner to the left and right rear wheels 24a and 24b, respectively.

It will be appreciated that while the vehicle 10 in the particular example provided employs a driveline 16 with a rear-wheel drive arrangement, the teachings of the present disclosure have broader applicability. In this regard, a shaft assembly constructed in accordance with the teachings of the present disclosure may interconnect a first driveline component with a second driveline component to transmit torque therebetween. In the context of an automotive vehicle, the driveline components could be a transmission, a transfer case, a viscous coupling, an axle assembly, a propshaft or a differential, for example.

Figure 2:
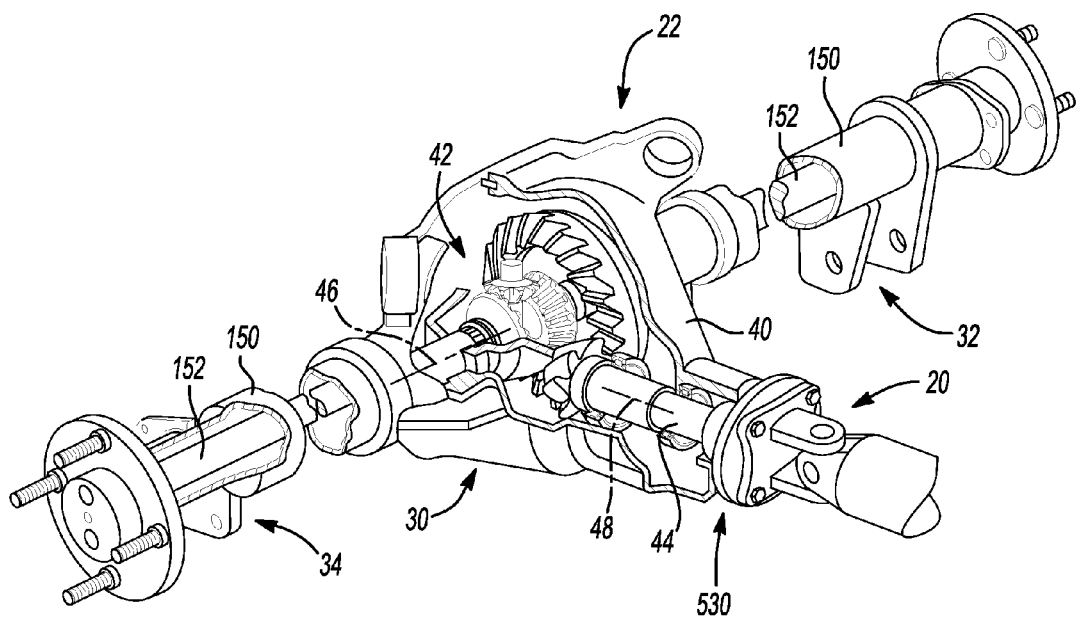
FIG. 2 is a top partially cut-away view of a portion of the vehicle of FIG. 1 illustrating the rear axle and the propshaft assembly in greater detail.

With reference to FIG. 2, the rear axle 22 can include a differential assembly 30, a left axle shaft assembly 32 and a right axle shaft assembly 34. The differential assembly 30 can include a housing 40, a differential unit 42 and an input shaft 44. The housing 40 can support the differential unit 42 for rotation about a first axis 46 and can further support the input shaft 44 for rotation about a second axis 48 that is perpendicular to the first axis 46.

Figure 3:
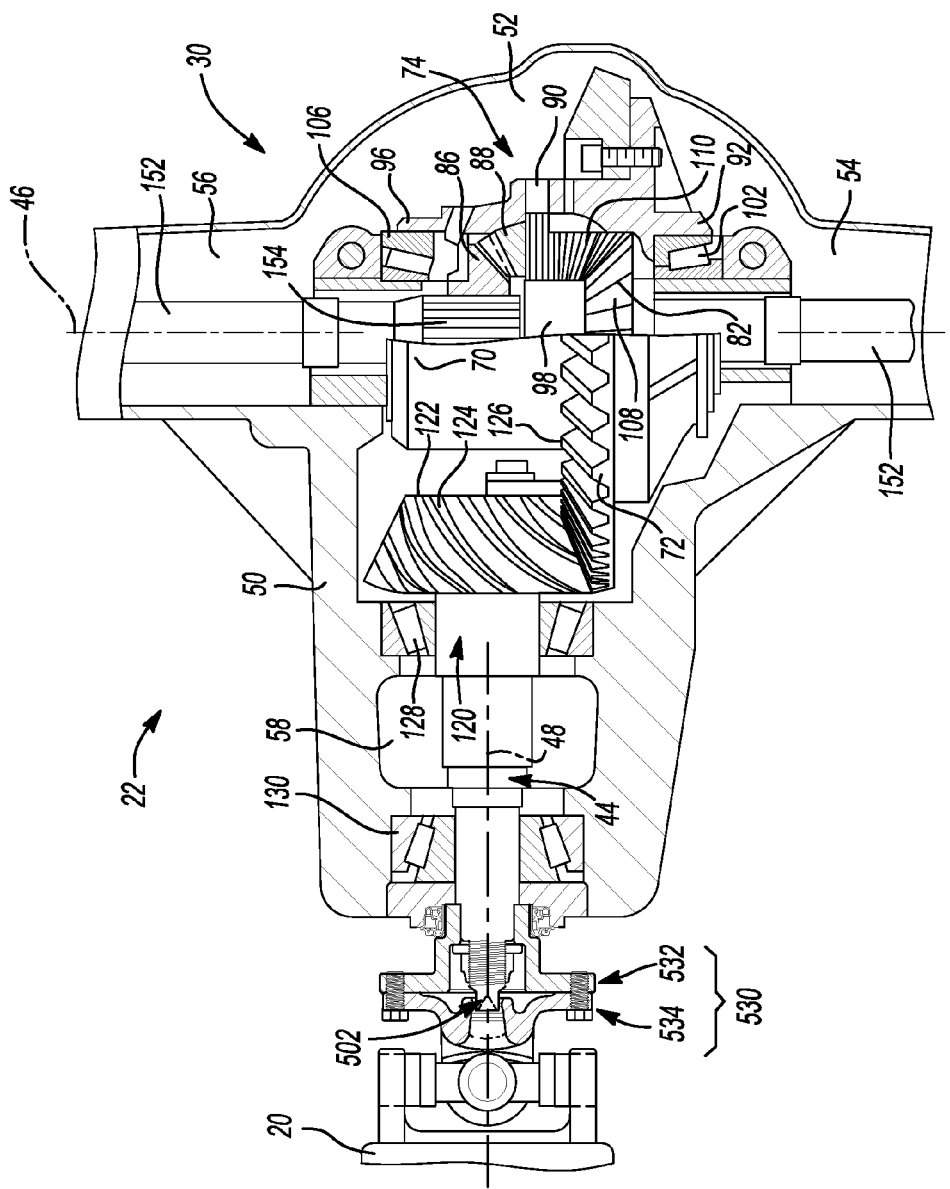
FIG. 3 is a sectional view of a portion of the rear axle and the propshaft assembly.

With additional reference to FIG. 3, the housing 40 can be formed in a suitable casting process and thereafter machined as required. The housing 40 can include a wall member 50 that can define a central cavity 52 that can have a left axle aperture 54, a right axle aperture 56, and an input shaft aperture 58. The differential unit 42 can be disposed within the central cavity 52 of the housing 40 and can include a case 70, a ring gear 72, which can be fixed for rotation with the case 70 and a gearset 74 that can be disposed within the case 70. The gearset 74 can include first and second side gears 82 and 86 and a plurality of differential pinions 88, which can be rotatably supported on pinion shafts 90 that can be mounted to the case 70. The case 70 can include a pair of trunnions 92 and 96 and a gear cavity 98. A pair of bearing assemblies 102 and 106 can support the trunnions 92 and 96, respectively, for rotation about the first axis 46. Axle half-shafts associated with the left and right axle assemblies 32 and 34 can extend through the left and right axle apertures 54 and 56, respectively, where they can be coupled for rotation about the first axis 46 with the first and second side gears 82 and 86, respectively. The case 70 can be operable for supporting the plurality of differential pinions 88 for rotation within the gear cavity 98 about one or more axes that can be perpendicular to the first axis 46. The first and second side gears 82 and 86 each include a plurality of teeth 108 which meshingly engage teeth 110 that are formed on the differential pinions 88.

The input shaft 44 can extend through the input shaft aperture 58 where it can be supported in the housing 40 for rotation about the second axis 48. The input shaft 44 can include a pinion shaft 120 and a pinion gear 122 having a plurality of pinion teeth 124 that meshingly engage the teeth 126 that are formed on the ring gear 72. A pair of bearing assemblies 128 and 130 can cooperate with the housing 40 to rotatably support the input shaft 44.

Figure 4:
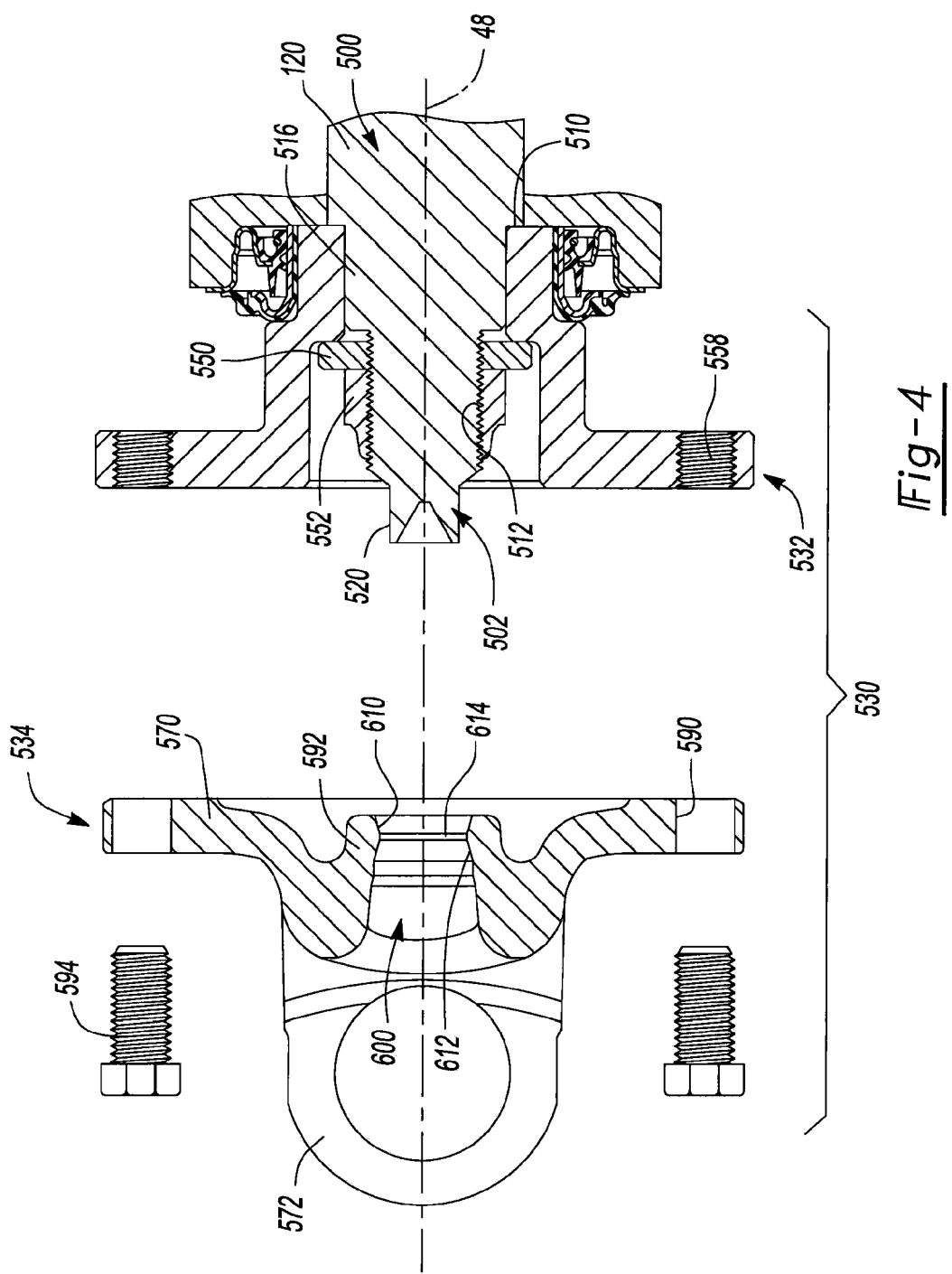
FIG. 4 is a partially exploded sectional view of a portion of the rear axle illustrating the coupling in more detail.

With reference to FIG. 4, the pinion shaft 120 can include a coupling portion 500 and a male guide portion 502. The coupling portion 500 can include an annular shoulder 510 which can be disposed about the second axis 48, a threaded portion 512, and a plurality of circumferentially spaced-apart axially extending splines 516 that can be disposed between the annular shoulder 510 and the threaded portion 512. The male guide portion 502 can be integrally formed with the coupling portion 500 and can include a guide member 520 that can be coaxial with the second axis 48. In the particular example provided, the guide member 520 is generally cylindrical in shape.

Returning to FIGS. 2 and 3, the input shaft 44 can be coupled for rotation with the propshaft assembly 20 via a coupling 530, which will be described in greater detail, below, to thereby transmit drive torque to the differential unit 42. More specifically, drive torque received by the pinion shaft 120 can be transmitted by the pinion teeth 124 to the teeth 126 of the ring gear 72 such that drive torque is distributed through the differential pinions 88 to the first and second side gears 82 and 86. The left and right axle shaft assemblies 32 and 34 each can include an axle tube 150 that can be fixed to the associated axle aperture 54 and 56, respectively, and an axle half-shaft 152 that can be supported for rotation in the axle tube 150 about the first axis 46. Each of the axle half-shafts 152 can include an externally splined portion 154 that can meshingly engage a mating internally splined portion (not specifically shown) that can be formed into the first and second side gears 82 and 86, respectively.

Figure 5:
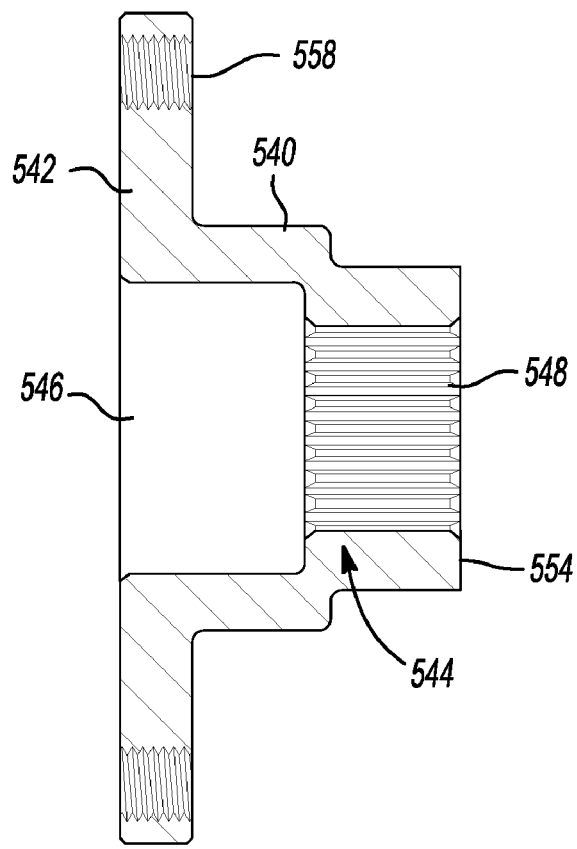
FIG. 5 is a sectional view of a portion of the coupling illustrating the flange structure in more detail.

With reference to FIGS. 4 and 5, the flange structure 532 can include an annular body 540 and a flange member 542 that extends radially outwardly from the annular body 540. The annular body 540 can include a mating coupling portion 544 and an interior recess 546. The mating coupling portion 544 can include a plurality of circumferentially spaced-apart axially extending splines 548 that are configured to matingly engage the splines 516 of the coupling portion 500 to couple the flange structure 532 to the pinion shaft 120 for rotation therewith. The interior recess 546 can be sized to receive a washer 550 (e.g., a lock washer) and a nut 552 that can be employed to fixedly but removably couple the flange structure 532 to the pinion shaft 120. More specifically, the nut 552 can be threadably engaged to the threaded portion 512 and can be employed to generate a clamping force that can be transmitted to the bottom of the interior recess 546 (e.g., to the end faces of the splines 548) to force a front face 554 of the annular body 540 against the annular shoulder 510. The flange member 542 can include a plurality of threaded mounting apertures 558.

Figure 6:
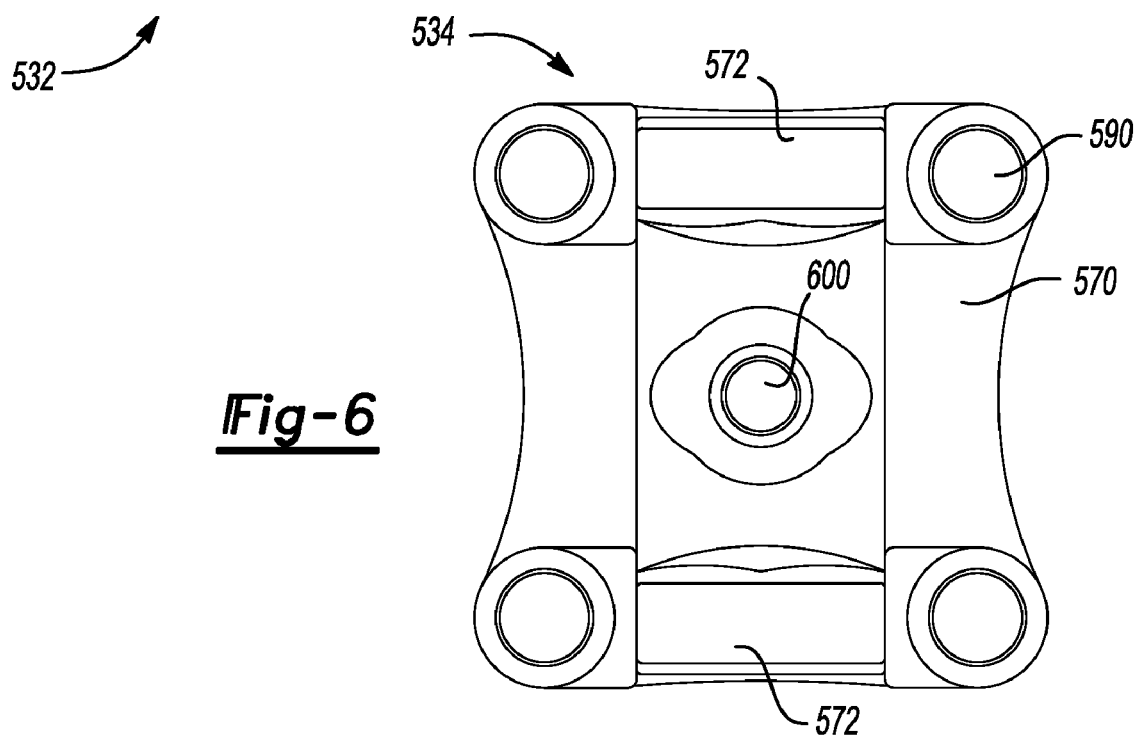
FIG. 6 is a front view of a portion of the coupling illustrating the yoke flange in more detail.
Figure 7:
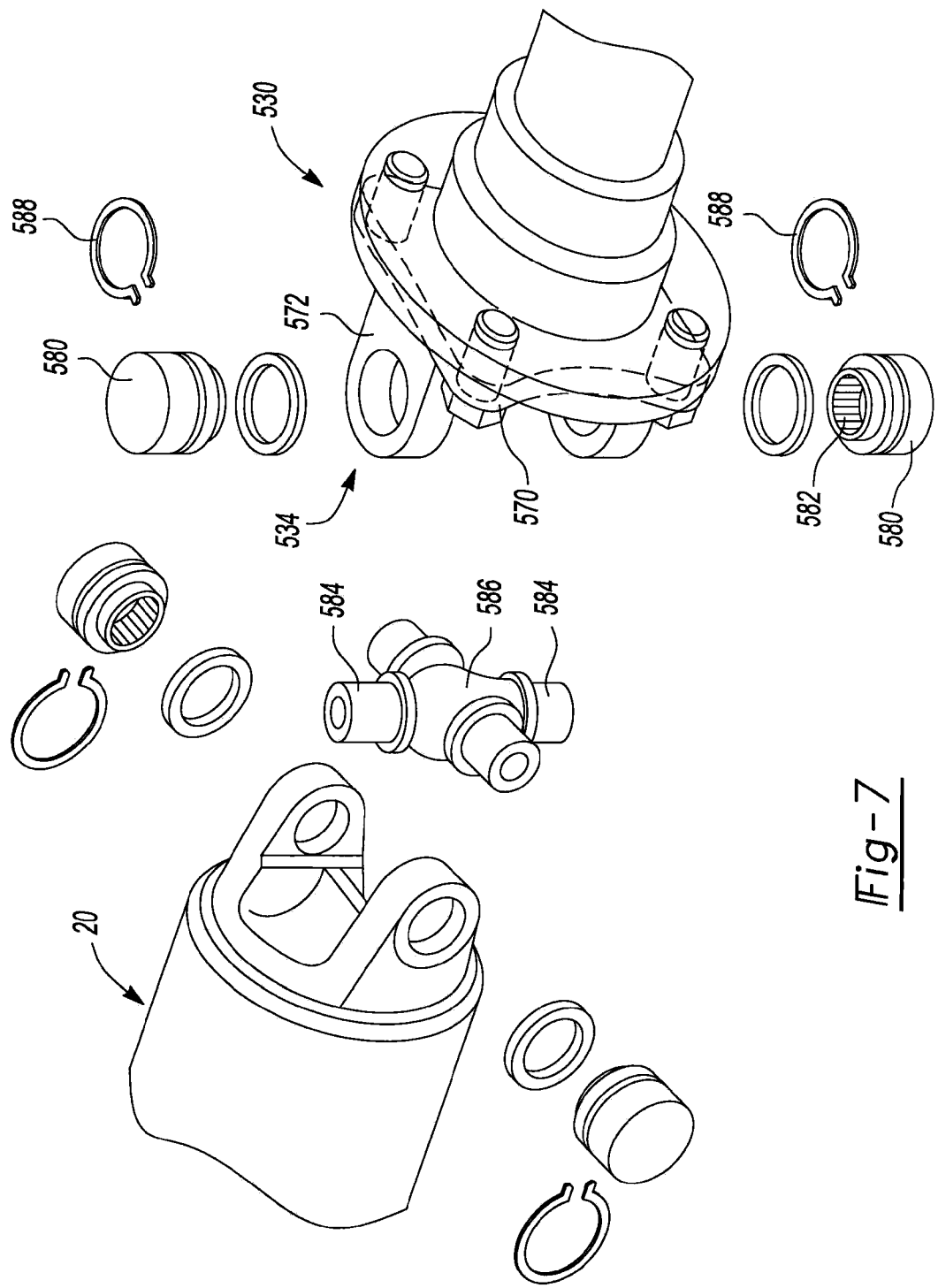
FIG. 7 is an exploded perspective view of a portion of the vehicle of FIG. 1, illustrating the connection between the rear axle and the propshaft in more detail.

In FIGS. 4, 6 and 7, the yoke flange 534 can be integrally formed in a suitable process, such as casting, and can include a flange base 570 and a pair of yoke mounts 572. The yoke mounts 572 can be conventionally configured to receive conventional bearing cups 580 that are associated with the bearings 582 and the trunnions 584 of a conventional cross-shaped trunnion or spider 586. Any suitable means, such as conventional snap rings 588, can be employed to retain the bearing cups 580 to the yoke mounts 572.

While the pinion shaft 120 and the yoke flange 534 have been illustrated and described as including a male guide portion 502 and a female guide portion 592, respectively, those of ordinary skill in the art will appreciate in view of this disclosure that the male guide portion 502 could be associated with the yoke flange 534 and that the female guide portion 592 could be associated with the pinion shaft 120. Moreover, it will be appreciated that the configuration of the male guide portion 502 and the female guide portion 592 may be configured in various other ways to permit direct alignment of the yoke flange 534 to the input shaft 44. For example, a deformable element can be included in either the male coupling portion or the female coupling portion.

Figure 8:
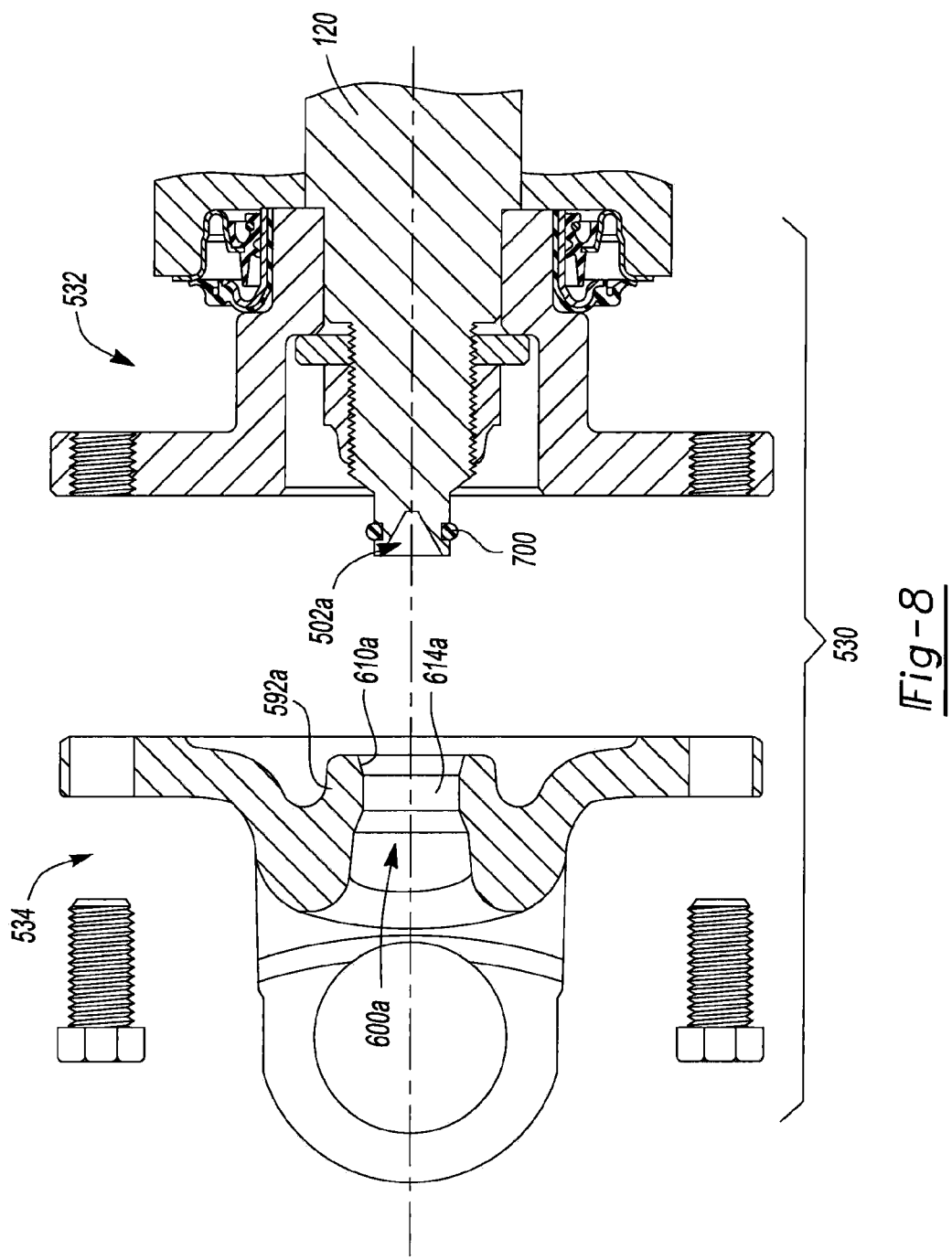
FIG. 8 is a view similar to that of FIG. 4 but illustrating a second coupling constructed in accordance with the teachings of the present disclosure.

In the example of FIG. 8, the male guide portion 502a is shown to be configured in a manner that is identical to the male guide portion 502 of FIG. 4, except for the inclusion of a deformable element 700. In the embodiment provided, the deformable element 700 is an O-ring that is formed of a resilient, elastomeric material. The coupling aperture 600a of the female guide portion 592a is sized to deformably receive the deformable element 700. More specifically, the securing zone 614a can be somewhat longer than that which is illustrated in FIG. 4 and sized to receive but compress the deformable element 700 when the male guide portion 502a is inserted into the female guide portion 592a. It will be appreciated that the coupling aperture 600a need not include a second tapering portion and that the first tapering portion 610a can be sized and shaped to aid in compressing or squeezing the deformable element 700. It will also be appreciated that the deformable element 700 could be initially mounted within the coupling aperture 600a and thereafter engaged to the male guide portion 502a.

Figure 9:
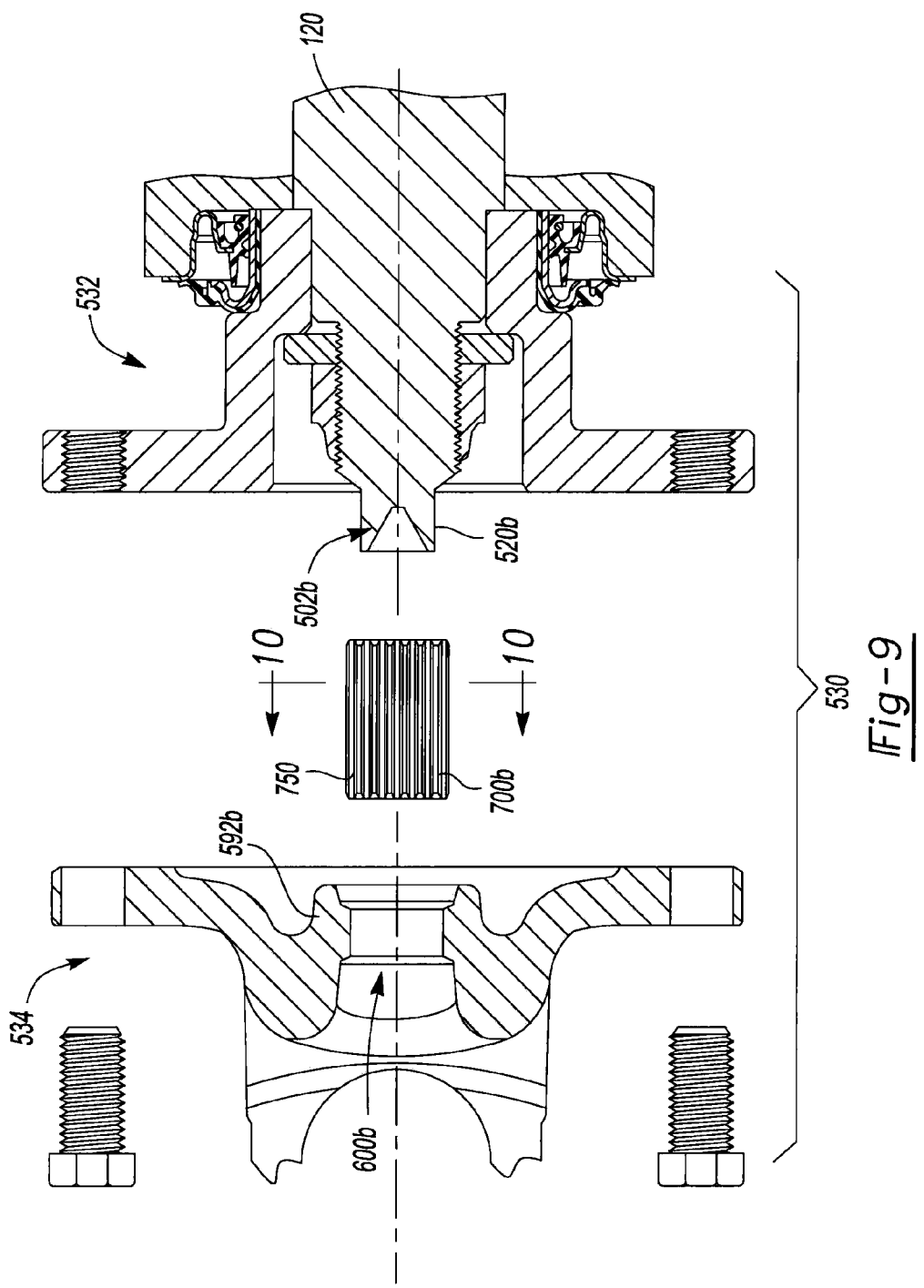
FIG. 9 is a view similar to that of FIG. 4 but illustrating a third coupling constructed in accordance with the teachings of the present disclosure.
Figure 10:
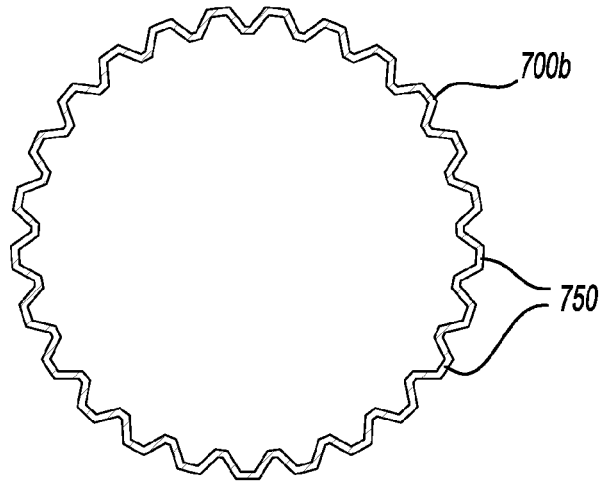
FIG. 10 is a section view taken along the line 10-10 of FIG. 9 illustrating the deformable element in more detail.
Figure 11:
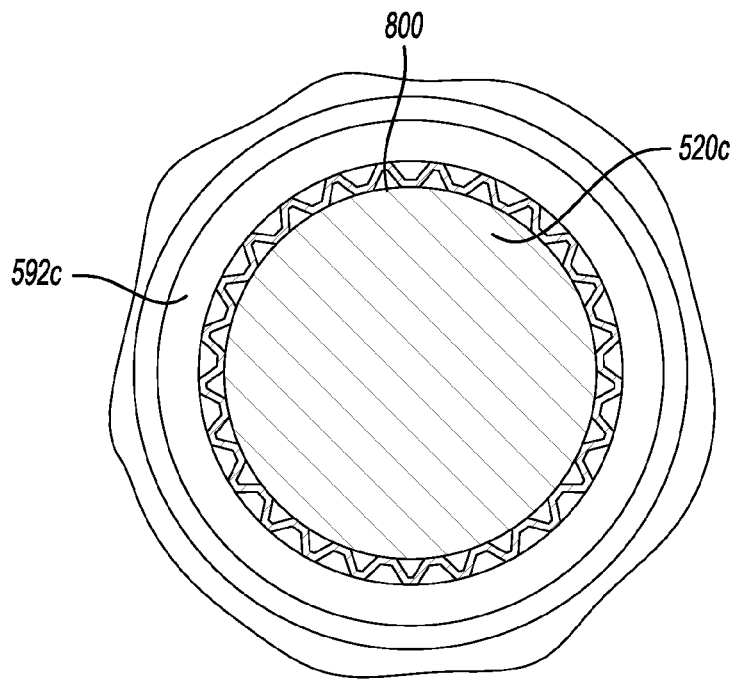
FIG. 11 is sectional view of a fourth coupling constructed in accordance with the teachings of the present disclosure, the section being taken through the male guide portion and facing the female guide portion.

The example of FIGS. 9 and 10 is generally similar to the previous example except that the deformable element 700b is an annular, axially extending structure having a plurality of longitudinally extending ridges 750. The deformable element 700b can be formed of any suitable material, such as sheet metal or injection-molded plastic, and is configured to be squeezed between the guide member 520b and the coupling aperture 600b when the male guide portion 502b is inserted into the female guide portion 592b. The deformable element 700b can be inserted over the guide member 520b or into the coupling aperture 600b prior to assembly. Alternatively, the deformable element(s) could be formed (e.g., via machining or overmolding) on the guide member 520b and/or in the coupling aperture 600b. In the case of machining, the deformable elements could comprise relatively narrow circumferentially spaced-apart spline members 800 that could fold or deflect during assembly of the guide member 520c into the female guide portion 592c as illustrated in FIG. 11. In this example, the spine members 800 are formed on the guide member 520c. It will be appreciated that knurling, reeding or other techniques can be substituted for the spline members 800.

Figure 12:
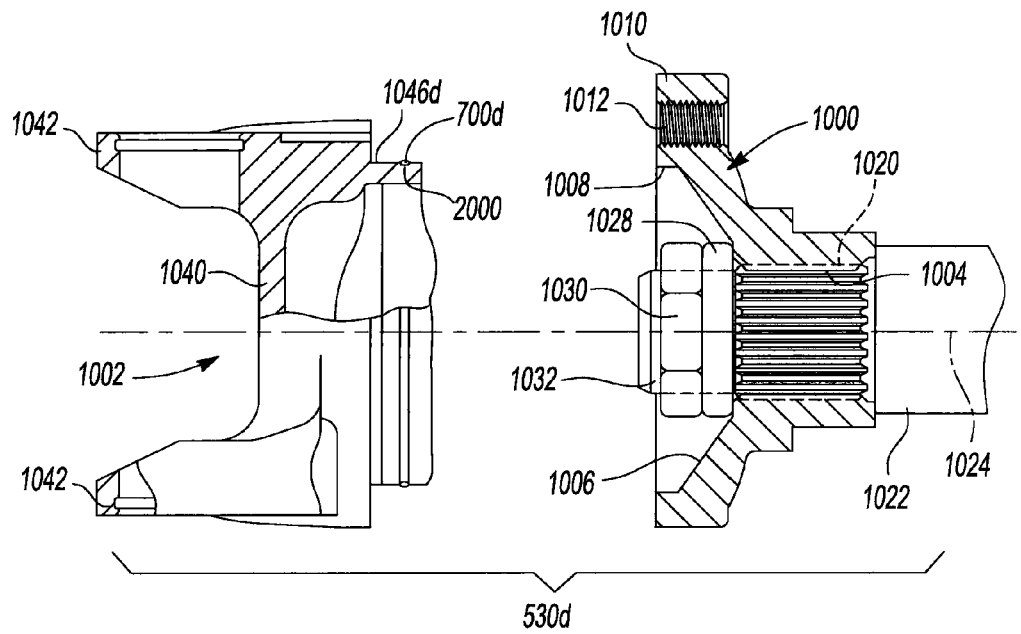
FIG. 12 is a partially exploded longitudinal sectional view of a fifth coupling constructed in accordance with the teachings of the present disclosure.
Figure 13:
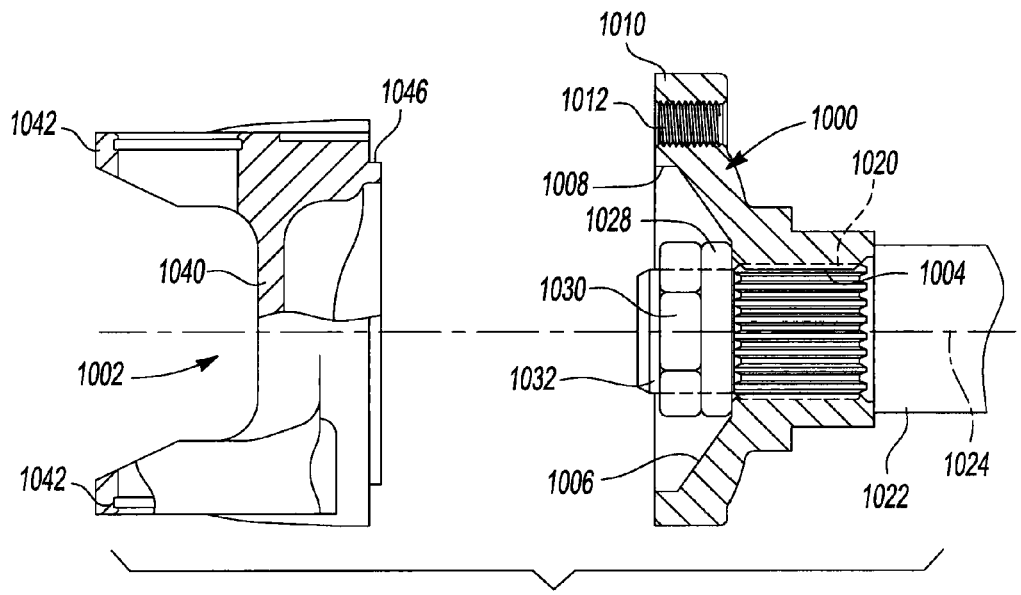
FIG. 13 is a partially exploded sectional view of a portion of a prior art coupling.
Figure 14:
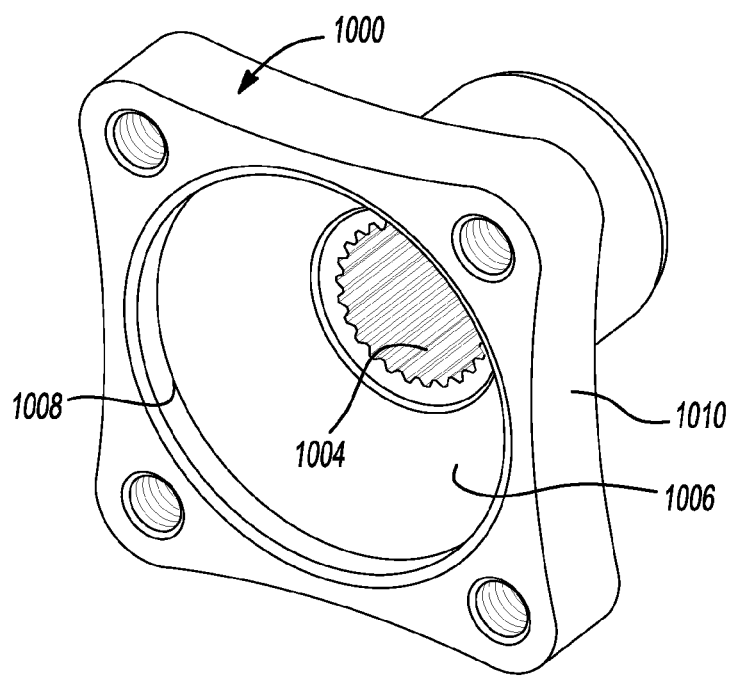
FIG. 14 is a perspective view of a portion of the coupling of FIG. 12 illustrating the flange structure in more detail.
Figure 15:
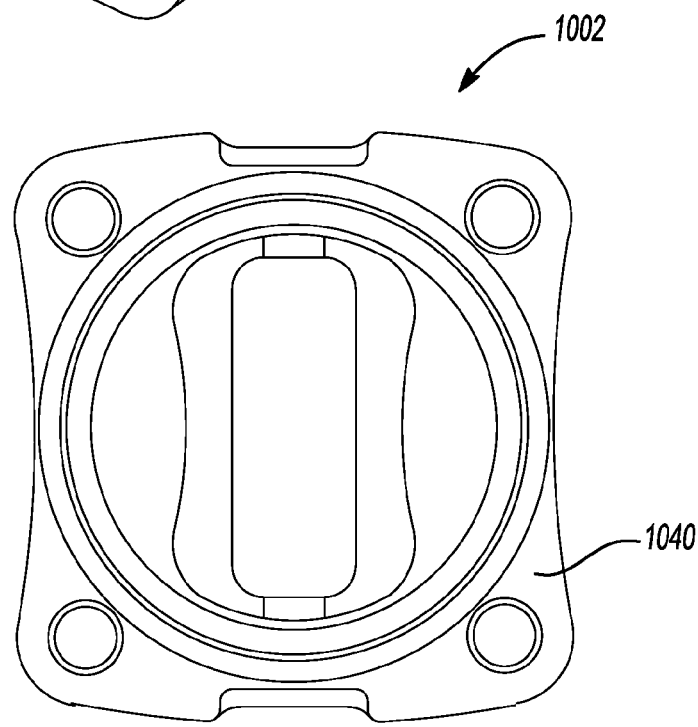
FIG. 15 is an end view of another portion of the coupling of FIG. 12 illustrating the yoke flange in more detail.

With reference to FIG. 12, the coupling 530d can be similar to the prior art coupling of FIGS. 13 through 15 discussed above, except that a deformable element 700d can be disposed between the pilot portion 1046d and the pilot bore 1008. In the particular example provided, the deformable element 700d is an O-ring that can be disposed in an O-ring groove 2000 that can be formed about the circumference of the pilot portion 1046d. It will be appreciated, however, that the deformable element 700d could be configured in any manner described above and/or could be coupled to the pilot bore 1008 instead of the pilot portion 1046d. It will also be appreciated that suitable chamfers or a radius can be formed on the pilot portion 1046d and/or the pilot bore 1008 as appropriate.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A drivetrain, comprising:
   a drivetrain component having a shaft that is rotatable about an axis;
   a flange coupled to said shaft;
   a yoke;
   a female guide portion coupled to one of said shaft and said yoke, said female guide portion having an aperture defined by an engaging portion and a first tapered portion which narrows in a direction toward said engaging portion;
   a male guide portion coupled to the other of said shaft and said yoke, said male guide portion engaging said engaging portion of said aperture for aligning said yoke relative to said axis; and
   fasteners for securing said flange to said yoke.

2. The drivetrain of claim 1, wherein said aperture further includes a second tapered portion adjacent an opposite side of said engaging portion and which enlarges in a direction away from said engaging portion.

3. The drivetrain of claim 1, wherein said male guide portion includes a guide member received within said aperture and engaging said engaging portion.

4. The drivetrain of claim 3, further including a deformable element formed on said guide member and sized to engage said engaging portion of said aperture.

5. The drivetrain of claim 3, further including a deformable element formed in said aperture of said female guide portion and engageable with said guide member.

6. The drivetrain of claim 1, wherein said male guide portion includes a guide member adapted for retention within said aperture.

7. The drivetrain of claim 6, further comprising a deformable element disposed between and engaging said guide member of said male guide portion and said engaging portion of said aperture in said female guide portion.

8. The drivetrain of claim 7, wherein said deformable element is a resilient ring mounted on said guide member.

9. The drivetrain of claim 7, wherein said deformable element is a sleeve having ridges engaging said guide member and said engaging portion of said aperture.

10. The drivetrain of claim 9, wherein said sleeve includes a plurality of longitudinally extending ridges.

11. The drivetrain of claim 1, wherein said drivetrain component is selected from a group including transmissions, transfer cases, torque couplings, axle assembiles, differentials and propshafts.

12. A drivetrain comprising:
a first drivetrain component having a shaft that is rotatable about an axis, said shaft including a male guide portion;
a flange structure coupled to said shaft; and
a yoke flange including a female guide portion;
wherein said male guide portion includes a guide member and a deformable element disposed about said guide member, said deformable element is an annular element engaging both said guide member and said female guide portion to thereby align said yoke flange to the axis, and wherein said yoke flange is coupled to said flange structure.

13. The drivetrain of claim 12, wherein said deformable element is formed of a resilient material.

14. The drivetrain of claim 12, wherein said female guide portion includes an aperture having an engaging portion and a first tapered portion adjacent said engaging portion, said first tapered portion narrowing with decreasing distance toward said engaging portion.

15. The drivetrain of claim 14, wherein said aperture further includes a second tapered portion adjacent said engaging portion on a side opposite said first tapered portion, said second tapered portion enlarging with increasing distance from said engaging portion.

16. A drivetrain, comprising:
a drivetrain component having a shaft that is rotatable about an axis;
a flange structure coupled for rotation with said shaft;
a yoke flange;
a female guide portion formed on one of said shaft and said flange structure, said female guide portion including an aperture having an engaging portion and a tapered portion adjacent to said engaging portion;
a male guide portion formed on the other one of said shaft and said flange structure, said male guide portion including a guide member adapted to be disposed within said aperture of said female guide portion and in engagement with said engaging portion of said aperture so as to align said yoke flange with said axis of said shaft; and
fasteners for securing said yoke flange to said flange structure;
wherein said guide member is cylindrical and establishes a locational interference fit engagement with said engaging portion of said aperture.

17. A shaft assembly comprising:
a first shaft;
a second shaft; and
a coupling assembly interconnecting said first shaft to said second shaft, said coupling assembly including a first flange coupled to said first shaft, a second flange coupled to said second shaft and a piloted flange connector interconnecting said first and second flanges along a common rotary axis, said piloted flange connector including a cylindrical male guide member formed at an end of said first shaft that is configured for insertion into a guide aperture formed in a female guide member of said second flange, said guide aperture including a tapered portion and an adjacent engaging portion sized to engage said male guide member upon insertion into said guide aperture.

18. The shaft assembly of claim 17, wherein said engaging portion of said guide aperture in said female guide member is cylindrical and sized to establish an interference fit with said cylindrical male guide member.

19. The shaft assembly of claim 17, wherein said guide aperture further includes a second tapered portion aligned adjacent an opposite edge of said engaging portion.

20. The shaft assembly of claim 19, wherein said coupling assembly further includes a resilient deformable element disposed between and in engagement with said male guide member and said engaging portion of said guide aperture.

21. The shaft assembly of claim 17, wherein said coupling assembly further includes a resilient deformable element disposed between and in engagement with said male guide member and said engaging portion of said guide aperture.

22. The shaft assembly of claim 17, wherein said coupling assembly further includes an annular deformable element having ridges disposed between and in engagement with said male guide member and said engaging portion of said guide aperture.

23. The shaft assembly of claim 22, wherein said annular deformable element is a tubular sleeve surrounding said male guide member and having a plurality of longitudinally-extending ridges.

* * * * *